United States Patent
Taylor et al.

(10) Patent No.: US 7,438,180 B1
(45) Date of Patent: Oct. 21, 2008

(54) MULTI-AXIS ADJUSTABLE CONVEYOR

(76) Inventors: John S. Taylor, 422 Whiskey Still Rd., Cleveland, GA (US) 30528; Thomas W. Barrett, 722 Sunnyside Rd., Hiawassee, GA (US) 30512

( * ) Notice: Subject to any disclaimer, the term of this patent is extended or adjusted under 35 U.S.C. 154(b) by 0 days.

(21) Appl. No.: 11/635,314

(22) Filed: Dec. 7, 2006

Related U.S. Application Data

(60) Provisional application No. 60/749,210, filed on Dec. 9, 2005.

(51) Int. Cl.
*B65G 15/60* (2006.01)
(52) U.S. Cl. .................... 198/861.2; 198/812
(58) Field of Classification Search ............ 198/861.2, 198/812
See application file for complete search history.

(56) References Cited

U.S. PATENT DOCUMENTS

| | | | |
|---|---|---|---|
| 3,920,115 A | * 11/1975 | Craggs | 198/822 |
| 4,144,965 A | 3/1979 | Alldredge et al. | |
| 4,476,975 A | * 10/1984 | Densmore | 198/861.2 |
| 4,489,826 A | * 12/1984 | Dubson | 198/812 |
| 4,773,528 A | 9/1988 | Anderson et al. | |
| 4,969,691 A | * 11/1990 | Moore et al. | 299/18 |
| 5,031,752 A | * 7/1991 | Rostowski et al. | 198/735.6 |
| 5,096,048 A | * 3/1992 | Lachner et al. | 198/733 |
| 5,228,549 A | * 7/1993 | Conner, Jr. | 198/303 |
| 2006/0070845 A1 | 4/2006 | Crookston | |

* cited by examiner

*Primary Examiner*—Mark A Deuble
(74) *Attorney, Agent, or Firm*—Kenneth S. Watkins, Jr.

(57) ABSTRACT

A multi-axis conveyor comprises a telescoping, articulating beam supported from a platform. A belt support assembly, comprising a plurality of belt support plates connected by telescoping, articulating joints and two end rollers provides support for a closed, flexible belt loop. A control system provides hydraulic fluid to hydraulic cylinders to telescope individual beam segments of the articulating beam and hydraulic motors for positioning multi-axis joints connecting the beam segments to position the end of the conveyor in the desired length and the desired horizontal and vertical position.

18 Claims, 16 Drawing Sheets

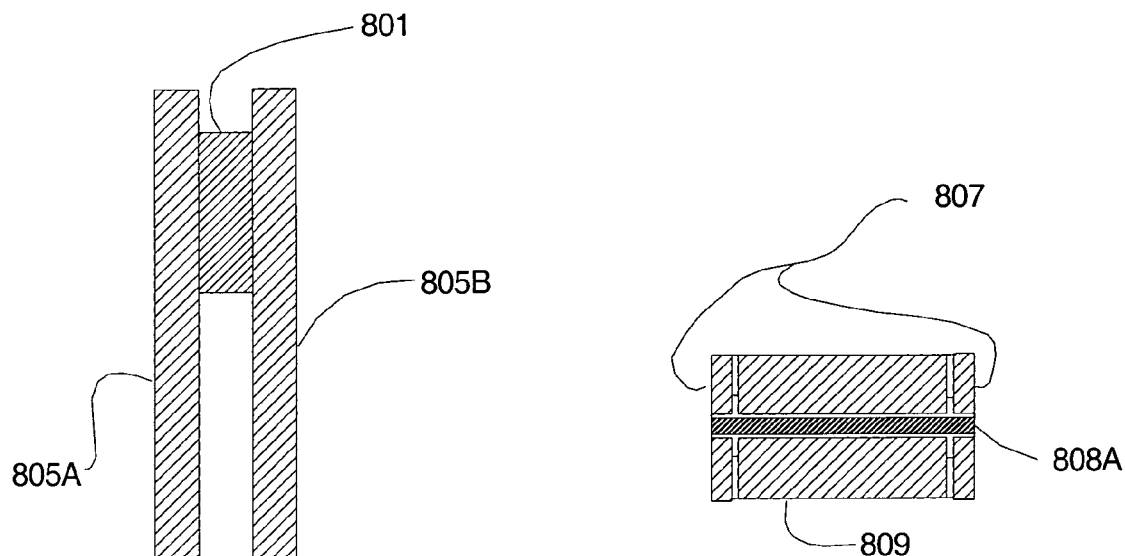
FIG. 9B
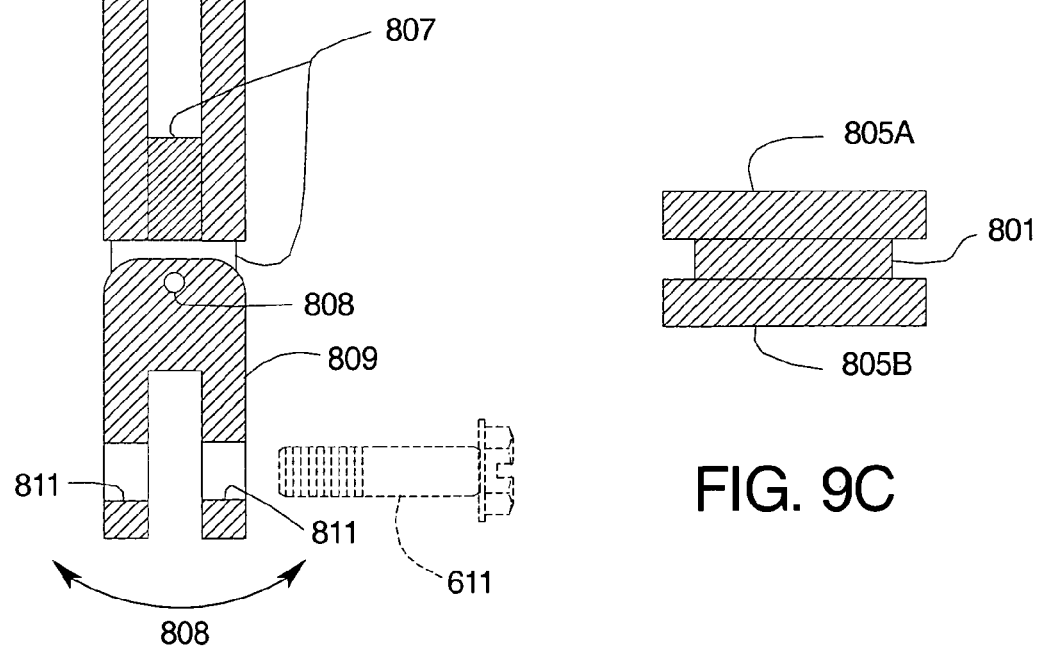
FIG. 9C
FIG. 9A

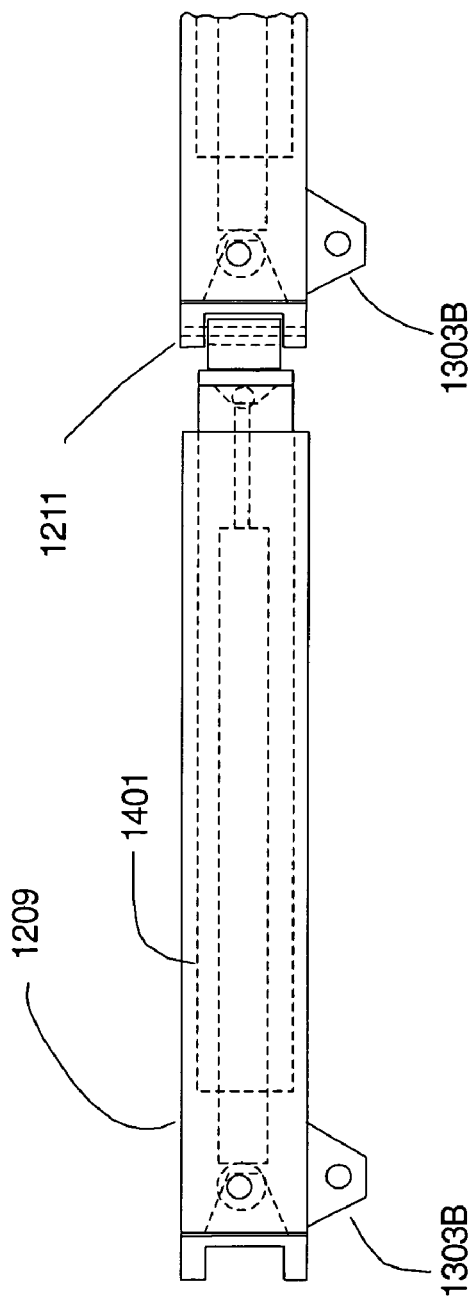
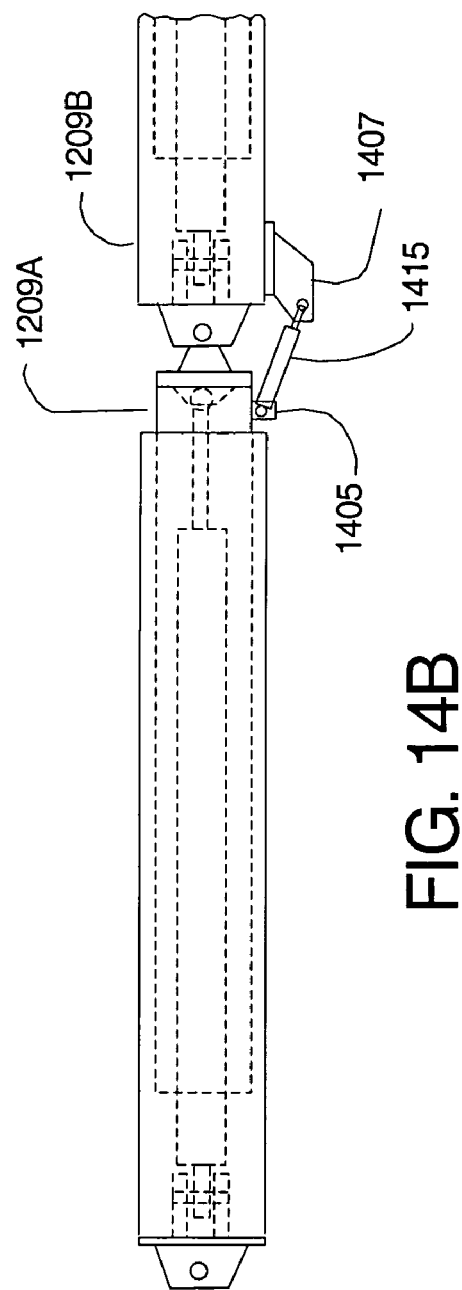
FIG. 14A
FIG. 14B

MULTI-AXIS ADJUSTABLE CONVEYOR

This application claims the benefits of U.S. Provisional Application Ser. No. 60/749,210 filed Dec. 9, 2005.

FIELD OF THE INVENTION

The present invention relates to conveyors and, more particularly, conveyors in which the lateral or horizontal position, length and elevation of the conveyor is adjustable.

BACKGROUND OF THE INVENTION

Conveyors are used in a large variety of manufacturing, poultry, agricultural, and distribution applications where conveying bulk material or articles is required. Many applications require the in feed or out feed locations to be changed. Considerable labor is often required to re-configure conveyors for the required path.

Prior conveyor designs have been disclosed to make the conveyor run adjustable. For example, U.S. Pat. No. 4,144,965 discloses a flexible conveyor track assembly utilizing segmented rails forming upper and lower runs to the conveyor. The segments have tongues and recesses aligned with the runs. This and other designs have proven complex and have not gained wide use.

PCT/US04/37063, hereby incorporated by reference, discloses a conveyor having a belt support assembly extendable and having support segments pivotable with respect to each other.

OBJECTS AND SUMMARY OF THE INVENTION

Therefore, an object of the present invention is to provide a conveyor that can be adjusted for different applications quickly and simply.

Another object of the present invention is to provide a conveyor that is adjustable in the lateral or horizontal direction.

Another object of the present invention is to provide a conveyor that is adjustable in length.

Another object of the present invention is to provide a conveyor that is adjustable in elevation.

Another object of the present invention is to provide a conveyor that is portable and can be easily moved to different locations.

Yet another object of the present invention is to provide a conveyor in which is simple and low in cost.

The multi-axis conveyor of the present invention comprises a belt support assembly for supporting a flexible belt configured in a continuous loop. The belt support assembly is made of a plurality of segments connected by multi-axis joints. The segments are extendable in a longitudinal direction, and the joints allowing movement of the segments in at least two axes relative to each other. End segments provide drive and tension rollers to provide belt drive and maintain belt tension. Side retainers maintain lateral alignment of the belt with the segments.

In one embodiment, the belt support assembly is supported from an extendable, articulated beam cantilevered from a fixed or mobile support platform. The articulated beam may be raised, lowered or rotated about the support platform. The articulated beam comprises individual extendable beam sections connected by two-axis joints. The extendable beam sections provide extension and retraction of the beam assembly and the multi-axis joints allow lateral and vertical motion of the beam. In the preferred embodiments, a segment of the belt support assembly is fixed to each beam section so that each beam section supports several segments of the belt support assembly. In the preferred embodiments, the multi-axis joints allow compound curvature of the conveyor in two planes.

In another embodiment of the multi-axis conveyor, the belt support assembly is supported from a plurality of mobile platforms. The platforms each comprise a vertically extendable column and an extendable beam. The platforms are attached to adjacent platforms by single axis or multi-axis joints to form an extended support assembly that can be raised vertically and curved laterally. The extended support assembly supports the belt support assembly at intervals so that each platform is attached to at least one segment of the belt support assembly. The platforms may utilize casters, rollers or other means to allow changes in position of each platform relative to each other.

The belt support assembly comprises a front support plate and a back support plate connected by a number of pivoted or multi-axis connected support plates. The support plates are angled with respect to the longitudinal and transverse directions in order to allow pivoting the plates with respect to each other without overlap. In the preferred embodiments, the flexible belt made of interlocking segments is slideably supported from the support plates by belt retainer segments attached to each of the support plates.

In the preferred embodiments, the conveyor utilizes a segmented plastic belt with interlocking segments that allows lateral curvature, including compound curvature of the belt. In the preferred embodiments, low friction retainer blocks attached to the pivot plates and end plates provide vertical and lateral sliding support to the flexible belt.

BRIEF DESCRIPTION OF THE DRAWINGS

These and other features, aspects and advantages of the present invention will become better understood with regard to the following description, appended claims and accompanying drawings where:

FIG. 9A is a cross section of the telescoping/articulating joint taken along lines 9A-9A of FIG. 8;

FIG. 9B is a cross section of the telescoping/articulating joint taken along lines 9B-9B of FIG. 8;

FIG. 9C is a cross section of the telescoping/articulating joint taken along lines 9C-9C of FIG. 8;

FIG. 14A is a side elevation drawing of the telescoping beam portions of the embodiment of FIG. 12; and FIG. 14B is a top view of the telescoping beam portions of the embodiment of FIG. 12.

DESCRIPTION OF THE PREFERRED EMBODIMENTS

The following is a description of the preferred embodiments of a multi-axis adjustable conveyor that can be easily adjusted to change the path of the conveyor in length, lateral (side to side) and elevation (up and down) directions. The use of multiple articulating joints in the beam assembly and belt support assemblies allows compound shapes of the conveyor in lateral and elevation directions.

Figure 1:
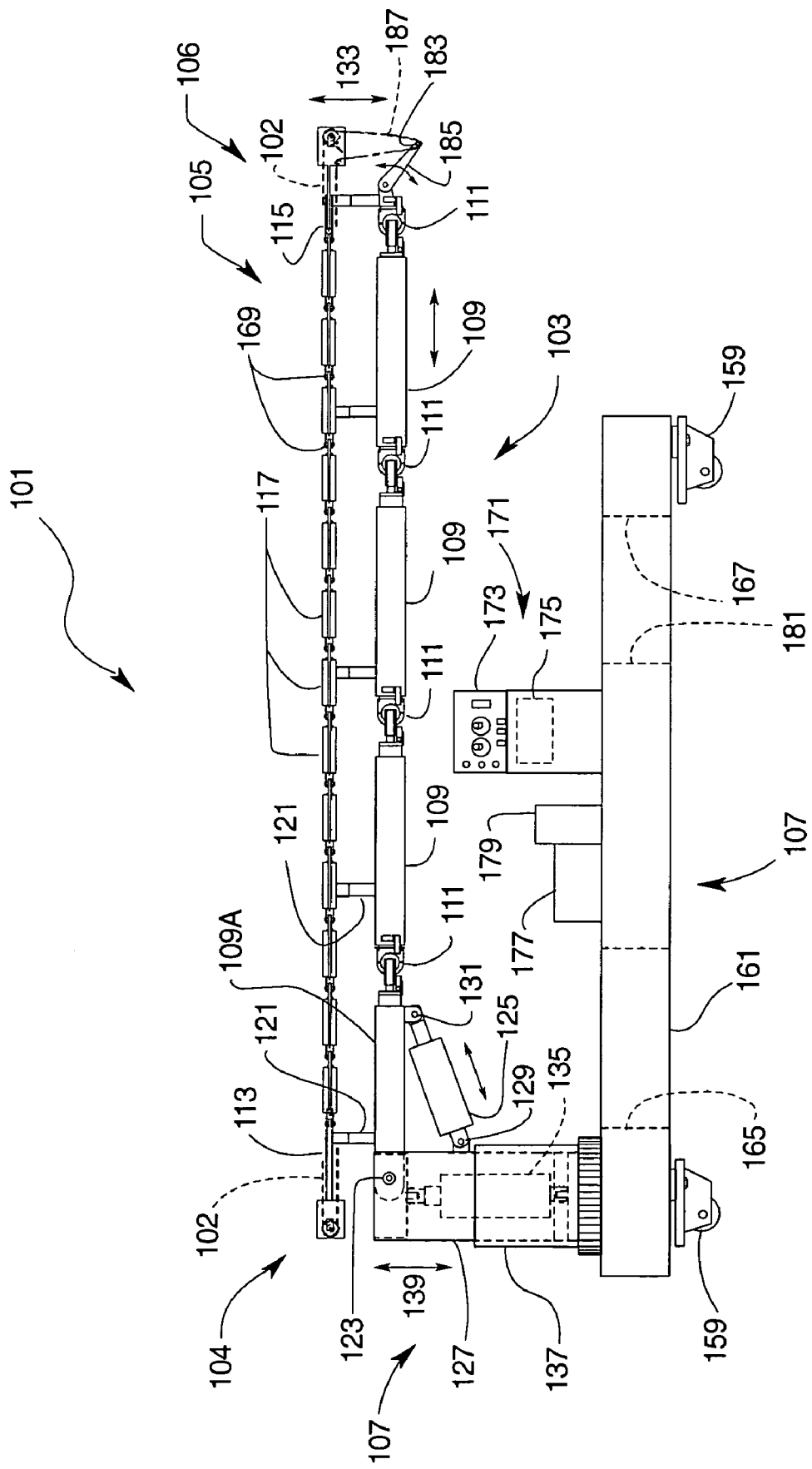
FIG. 1 is a side elevation drawing of a preferred embodiment of the multi-axis conveyor having a movable platform, an articulating support beam assembly supported from a support column, and an articulating belt support assembly supported from the articulating beam assembly by a plurality of plate supports.
Figure 2:
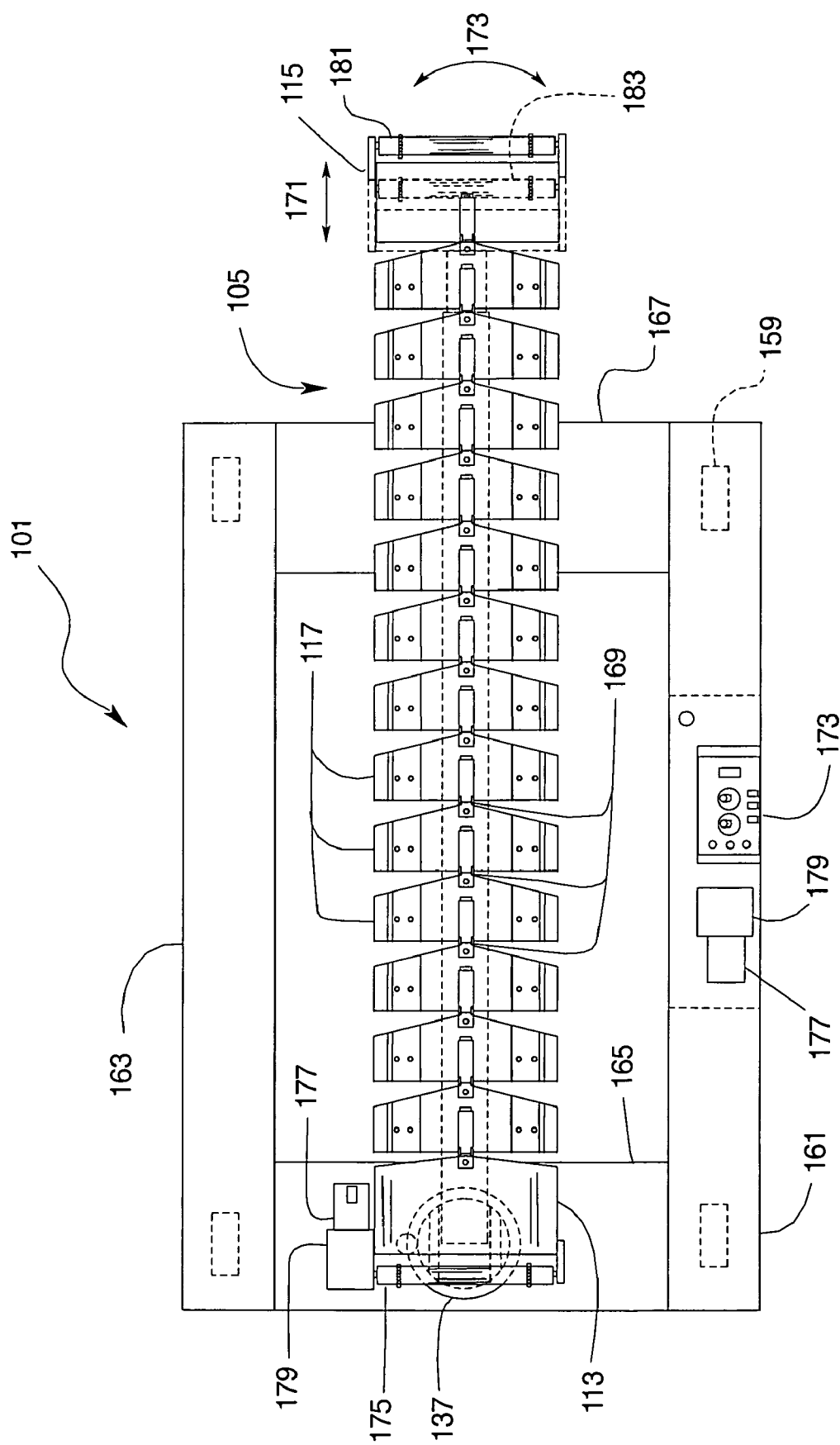
FIG. 2 is plan view of the multi-axis conveyor.
Figure 3:
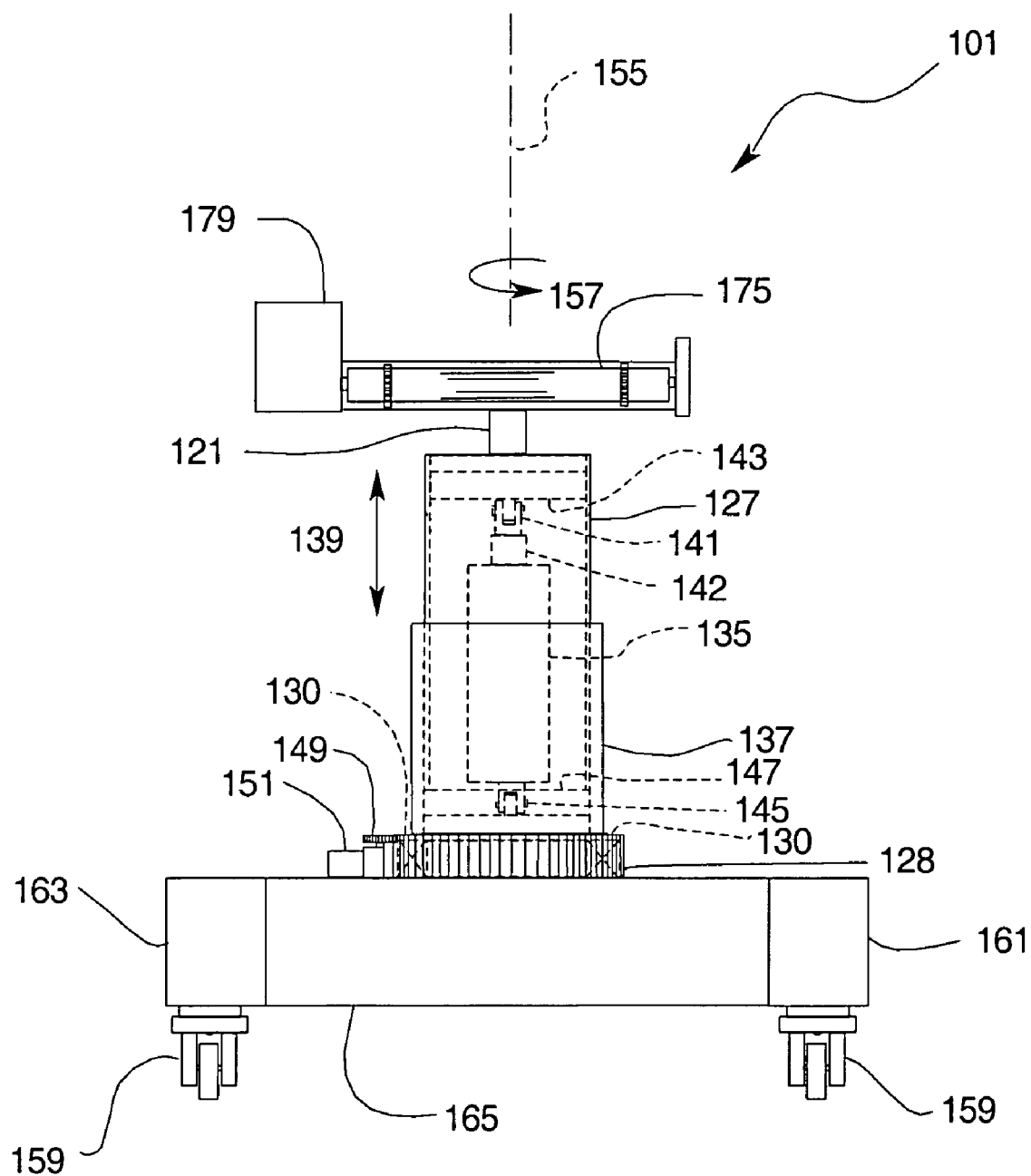
FIG. 3 is an end view of the multi-axis conveyor looking at the drive end and showing the telescoping and rotating support column for the articulating beam assembly.

FIGS. 1-3 are respectively a side elevation drawing, plan view and end view, of a multi-axis adjustable conveyor 101 consisting of an articulating beam assembly 103, an articulating belt support assembly 105 and a platform assembly 107. Articulating beam assembly 103 utilizes a plurality of telescoping beam portions or sections 109 and articulating or multi-axis beam joints 111. Articulating belt support assembly 105 utilizes a first or drive end segment 113, a second or driven end segment 115 and a plurality of intermediate segments 117 connected by telescoping/articulating segment joints 169. Belt 102, extending from drive end 104 to driven end 106 and supported by articulating belt support assembly 105 provides a means to support and transport articles as shown in the following figures. Only a portion of belt 102 is shown for clarity.

Articulating beam assembly 103 supports articulating belt support assembly 105 at support posts 121. In the preferred embodiments, each telescoping beam section 109 supports a plurality of end and/or intermediate segments as shown in the figure.

Platform 107 provides support for articulating beam assembly 103 at beam pivot pin 123 and by beam pivot cylinder 125 through telescoping support column 127. Beam pivot cylinder 125, connected to cylindrical support column 127 at pivot pin and clevis assembly 129 and first telescoping beam section 109A pivot pin and clevis assembly 131, provides driven end 106 raising or lowering as indicated by arrow 133.

Beam lift cylinder 135, mounted interior to support column 127 and cylindrical column base 137, provides beam lift at driven end 104 as shown by arrow 139. Pin and clevis assembly 141 connects rod 142 of lift cylinder 135 to support column 127 at bracket 143. Pin and clevis assembly 145 connects lift cylinder 135 to column base 137 end plate 147. Column base 137 provides a telescoping fit with telescoping support column 127. Bearings 130 provide rotational support to gear portion 128 of column base 137. Pinion 149 of hydraulic gear motor 151 engages gear portion 128 of column base 137 to provide rotation of support column 127 about vertical axis 155 as shown by arrow 157. A key and slot or splined fit (not shown) prevents rotation of support column 127 with respect to column base 137 while allowing telescoping motion of support column 127.

Locking caster wheels 159 attached to longitudinal beams 161, 163 provide a means to position and reposition conveyor 101 quickly and easily. Cross beams 165, 167 provide structural support for longitudinal beams 161, 163. In still other embodiments, a rigid mount such as a permanently fixed fabricated steel base replaces platform assembly 107.

As best seen in FIG. 2, drive end segment 113, driven end segment 115, and intermediate segments 117 of articulating belt support assembly 105 are connected by telescoping/articulating segment joints 169. Joints 169 allow the segments to extend or contract in the direction of arrows 171, deflect transversely as shown by arrows 173, or deflect upwards or downwards as shown in following figures. Drive end roller 175, driven by motor 177 and gearbox 179 provide motive power for belt 102. Driven end roller 181 provides a return function for belt 102. Tension roller 183, mounted on pivot arm 185 and biased in the downward direction by a biasing element such as a spring (not shown) provides belt tension and a belt loop run 187. The belt loop provides the additional belt run when articulating belt support assembly 105 is extended, and the provides takes up slack when articulating belt support assembly 105 is retracted. Belt 102 forms a closed loop around drive end roller 175, driven end roller 181 and tension roller 183.

Control system 171 provides control functions for the conveyor and comprises an interface control panel 173, a controller 175 and distributed control components as described in the following sections. Hydraulic pump 179, powered by electric motor 177 provides pressurized hydraulic fluid to the actuators from reservoir 181.

Figure 4:
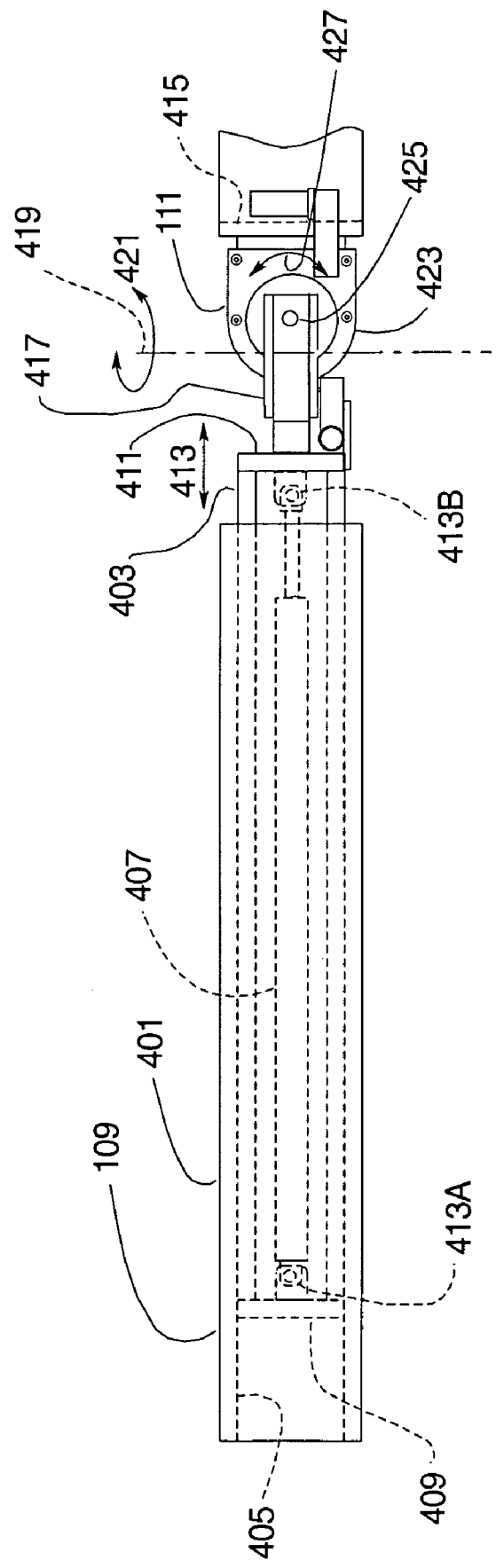
FIG. 4 is a detail elevation drawing of a telescoping beam section and the two-axis articulating joint connecting adjacent beam sections.

FIG. 4 is a detail elevation drawing of telescoping beam section 109 comprising outer beam portion 401, inner beam portion 403 and articulating beam joint 111. Inner beam portion 403 has a close sliding fit with the inner wall 405 of outer beam portion 401. Beam extension cylinder 407, connected to outer beam portion 401 end bracket 409 and inner beam portion bracket 411 by pin/clevis assemblies 413A, 413B, provides motive power for beam extension and retraction as shown by arrows 413.

Articulating beam joint 111, attached to inner beam portion bracket 411 and bracket 415 of the adjacent outer beam portion, provides two-axis motion between adjacent beam sections. Horizontal joint assembly 417 provides adjacent beam section rotation about vertical axis 419 as shown by arrows 421. Vertical joint assembly 423 provides adjacent beam section rotation about horizontal axis 425 as shown by arrows 427.

Figure 5:
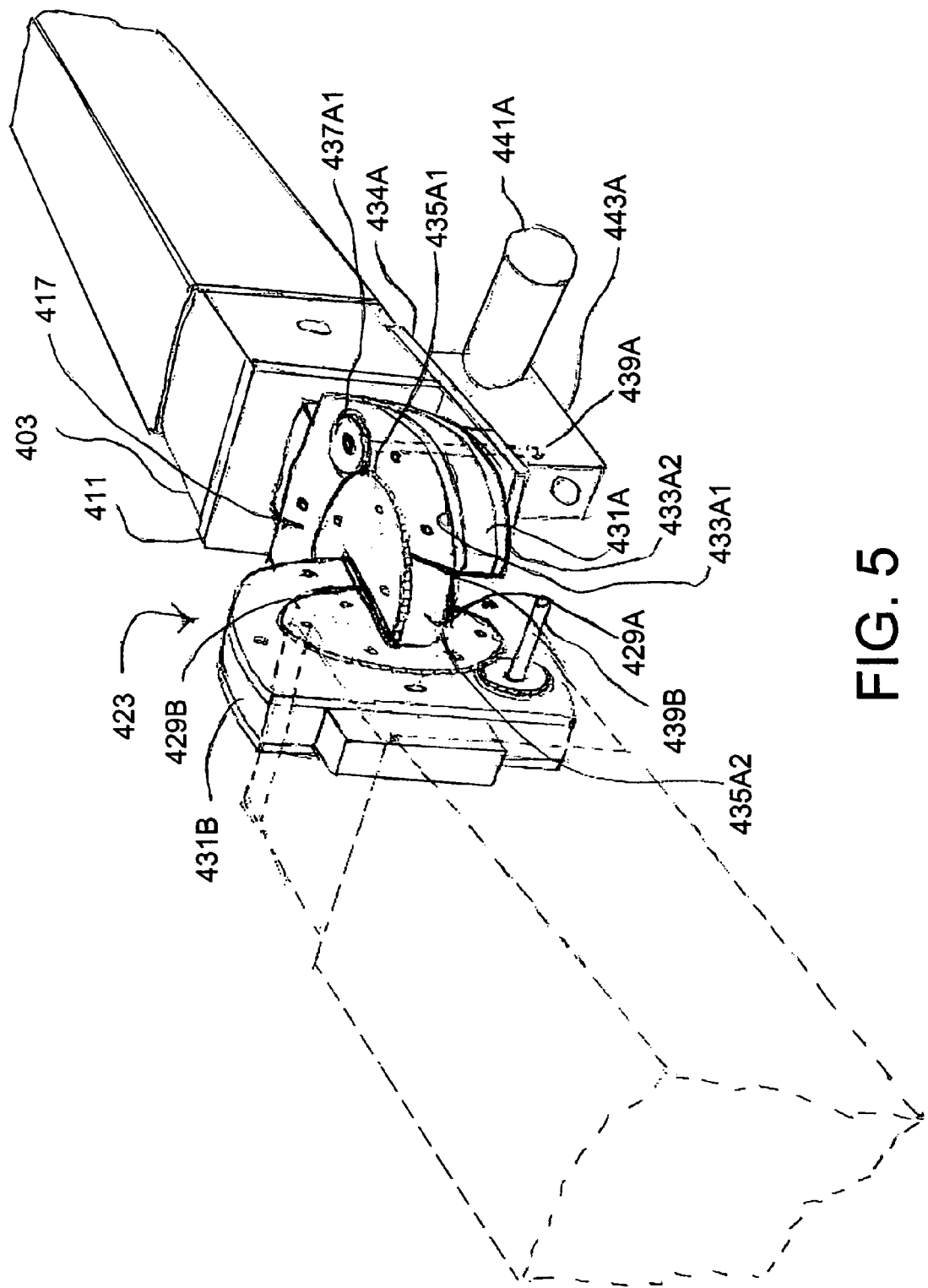
FIG. 5 is a detailed perspective view of two adjacent telescoping beam sections and the two-axis articulating joint.

FIG. 5 is a perspective drawing view of the articulating beam joint looking towards inner beam portion bracket 411. Horizontal joint assembly 417 comprises a cylindrical core plate 429A enclosed by a close-fitting housing 431A. Core plate 429A is retained in housing 431A by upper and lower cover plates 433A1, 433A2. Top spur gear 435A1, bolted to the top of core plate 429A, is of smaller diameter than core plate 429A and fits inside cover plate 433A1. Top pinion gear 437A1, mounted on shaft 439A engages top spur gear 435A1. Shaft 439A is supported by a journal (not shown) in housing 431A. A bottom spur gear 435A2 is engaged by a bottom pinion gear (not shown) mounted on shaft 439A. Shaft 439A is driven by a hydraulic motor 441A and gearbox 443A to provide rotation of core plate 429A. Gear box 433A is attached to inner beam portion 403 by bracket 434A Core plate 429A and respective spur gears 435A1, 435A2 have a rectangular cut-out portion to receive vertical joint assembly 423 as shown in the figure. Core plate 429A of horizontal joint assembly 417 is pinned to core plate 429B of vertical joint assembly 423 by two pins (not shown) to lock the respective core plates together. The pins fit in holes drilled horizontally through core plate 429A and match with holes drilled horizontally through the core plate (not shown) of vertical joint assembly 423. Assembly and operation of vertical joint assembly 423 is similar to horizontal joint assembly 417. The respective hydraulic motor and gearbox connected to pinion shaft 439B is not shown for clarity.

Figures 6, 6A:
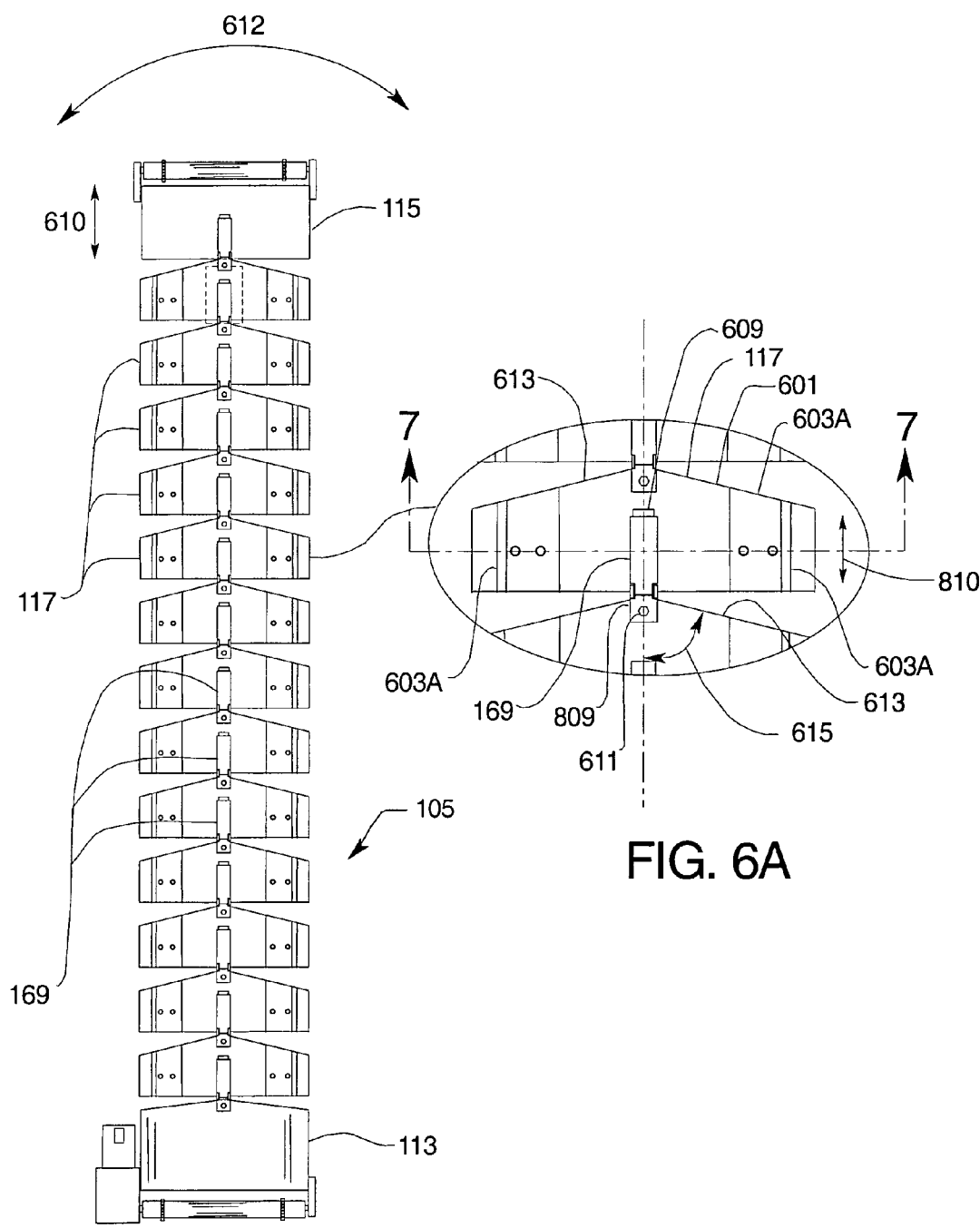
FIG. 6 is a plan view of the articulating belt support assembly of FIG. 1.
FIG. 6A is a detailed plan view of the telescoping/articulating joint connecting belt support segments.
Figure 7:
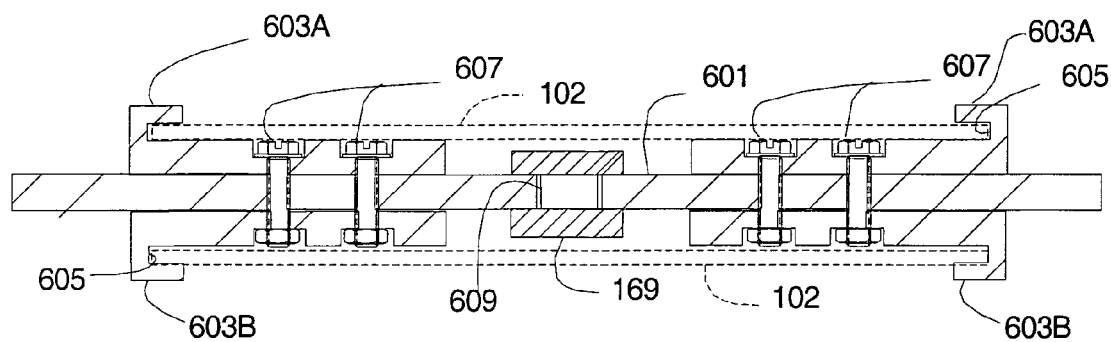
FIG. 7 is a cross section of an intermediate support plate taken along lines 7-7 of FIG. 6A and showing the belt retaining blocks of the support plates.

FIG. 6 is a top view of articulating belt support assembly 105 showing drive end segment 113, driven end segment 115, and intermediate segments 117. FIG. 6A is a detail top view of intermediate segments 117 and telescoping/articulating segment joints 169. FIG. 7 is a cross section of intermediate segment 117 taken along lines 7-7 of FIG. 6A.

Segments 117 comprise plates 601 connected by joints 169. Top belt retainer blocks 603A and bottom belt retainer blocks 603B comprise channels 605 which retain belt 102 along segments 117. Fasteners 607 attach blocks 603A, 603B to plate 601.

Figure 8:
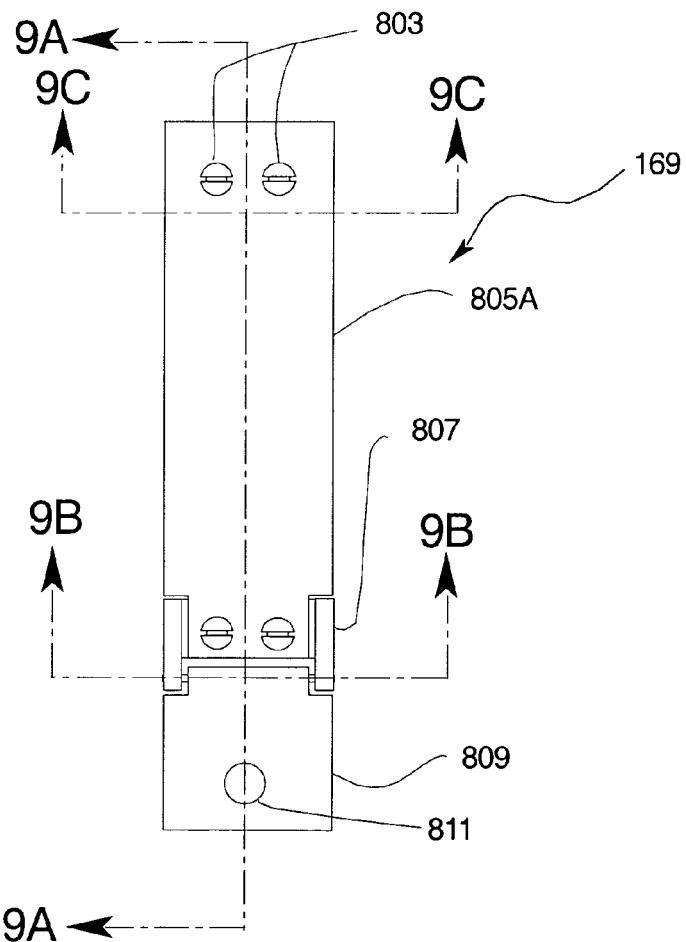
FIG. 8 is a detail plan view of the telescoping/articulating joint connecting belt support segments.

FIG. 8 is a plan view of telescoping/articulating segment joint 169. FIGS. 9A, 9B and 9C are cross sections of joint 169 taken along lines 9A-9A, 9B-9B and 9C-9C respectively of FIG. 8. Sliding block 801 has a close sliding fit with slot 609 of plate 601, allowing longitudinal (telescoping) movement of intermediate segments as indicated by arrows 810 and extension and retraction of articulating belt support assembly 105 as shown by arrows 610.

Fasteners 803 attach top joint plate 805A and bottom joint plate 805B to sliding block 801 and spacer/pivot assembly 807. Pivot pin 808A, retained in aperture 808 provides a vertical pivot attachment between spacer/pivot assembly 807 and clevis/pivot bracket 809 as shown by arrows 808. Fastener 611, inserted into apertures 811 of bracket 809 and the corresponding aperture in plate 601 acts as a pivot pin and provides a horizontal pivot connection between clevis/bracket 809 and plate 601. Angled plate edge 613, making an angle 615 of less than 90 degrees, allows lateral (horizontal) adjustment of adjacent segments 117 as indicated by arrows 612.

Figure 10:
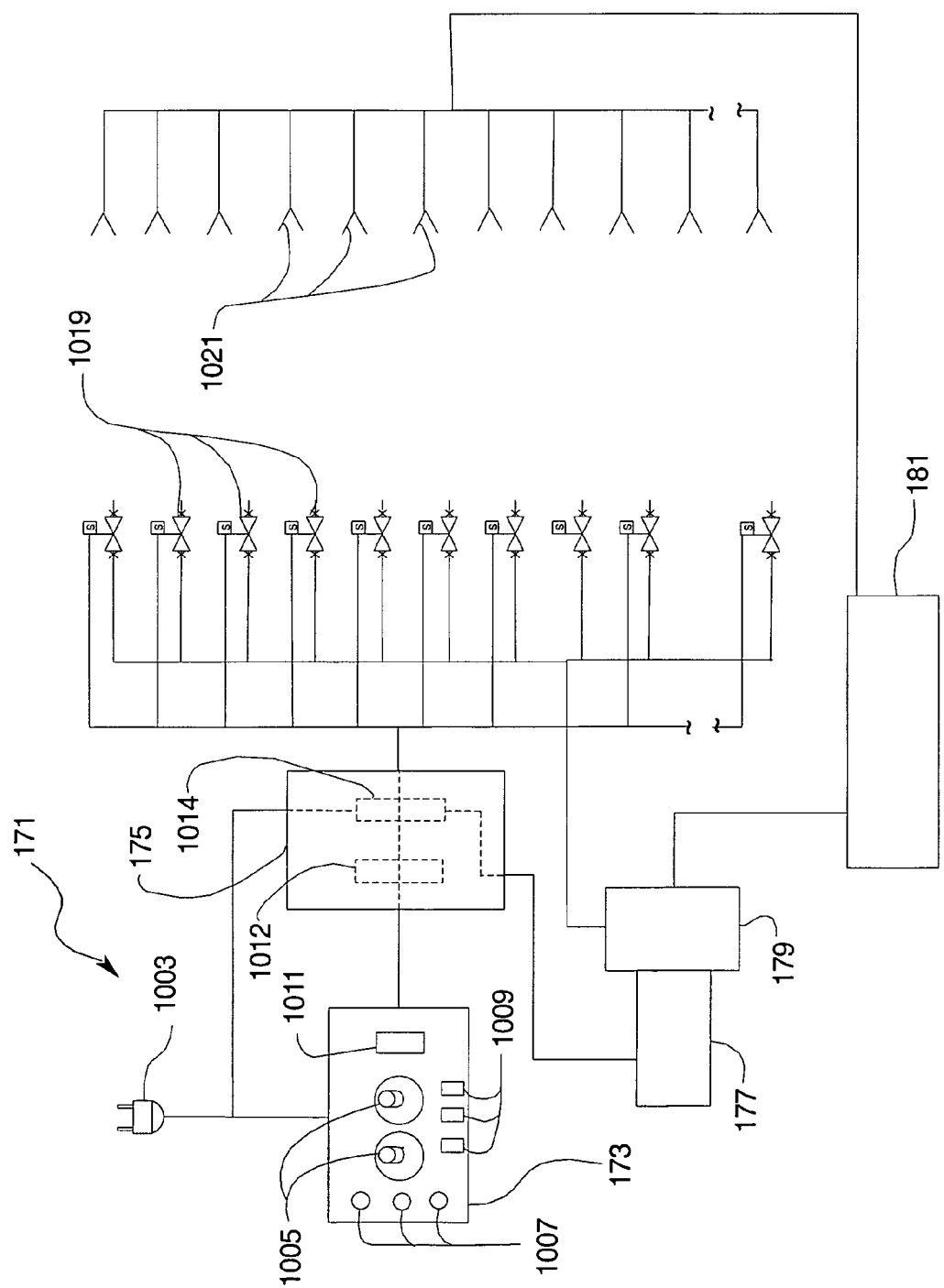
FIG. 10 is a flow diagram of the control system of the multi-axis conveyor showing the control interface, controller, and hydraulic components of the system.

FIG. 10 is a schematic diagram of a control system for the multi-axis adjustable conveyor having a control interface 173 powered from a source of AC power by plug 1003. Interface 173 utilizes input devices such as joysticks 1005, potentiometers 1007 and switches 1009. A computer or network connector 1011 may be used to connect a computer or network device such as a wireless network device for remote operation and control. Controller 175, connected to interface 173 receives inputs from the interface components and provides data processing functions through a microprocessor 1012 and control output via control components 1014 such as drivers, amplifiers, and electronic or electromechanical relays. Controller 175 provides power to electric motor 177 connected to a hydraulic pump 179 to provide pressurized hydraulic fluid to the actuators described in the previous sections via hydraulic control components such as solenoid valves 1019. Hydraulic returns 1021 provide a means to return hydraulic fluid to reservoir 181. In other embodiments, control interface 173 is a handheld device communicating by wired or wireless means to controller 175.

Figure 11A:
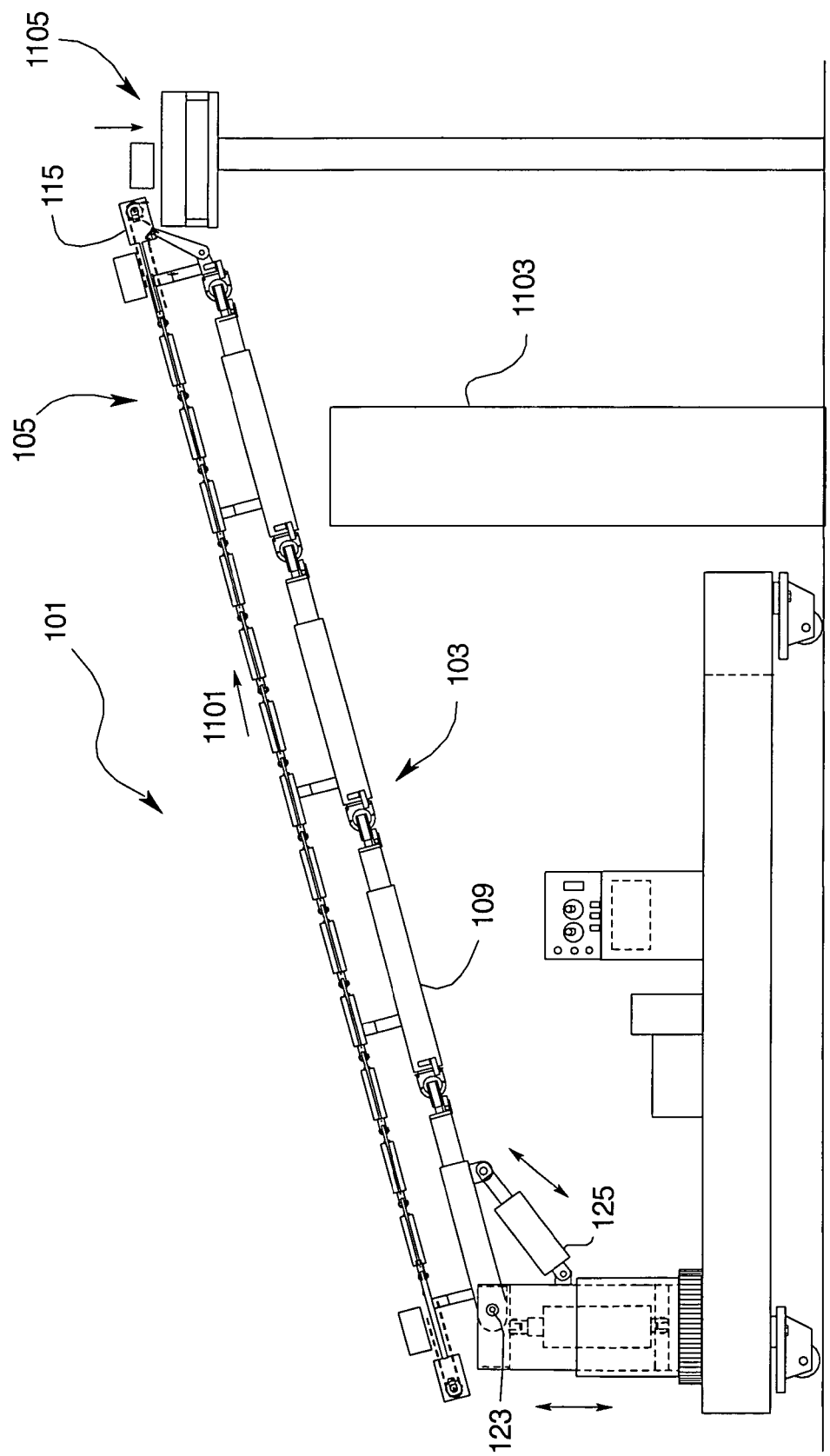
FIG. 11A is a side elevation drawing of the multi-axis conveyor showing the beam sections of the articulating beam assembly telescoped and the beam pivot cylinder extended to provide clearance of the end of the conveyor over and beyond an obstruction.

FIG. 11A is a side elevation drawing of multi-axis adjustable conveyor 101 with articulating beam assembly 103 pivoted at beam pivot pin 123 by beam pivot cylinder 125. The figure also shows telescoping beam sections 109 of beam assembly 105 extended by respective beam extension cylinders shown in FIG. 4. The extension of beam sections 109 provides extension 1101 of beam assembly 103 and articulating belt support assembly 105 to allow positioning of driven end segment 115 to target 1105 beyond obstructions such as obstruction 1103. Belt 102 is omitted for clarity.

Figure 11B:
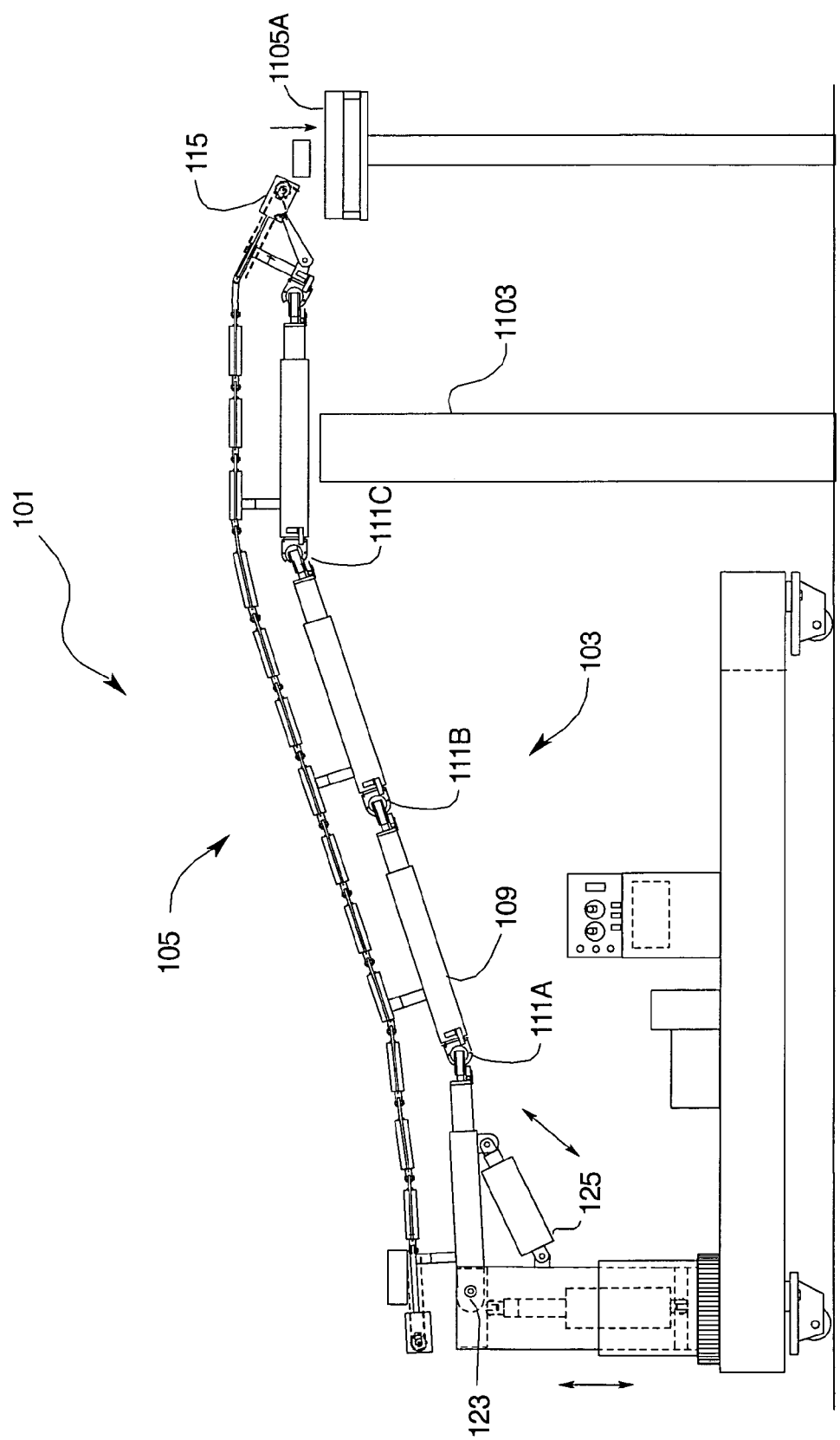
FIG. 11B is a side elevation drawing of the multi-axis conveyor showing the beam sections of the articulating beam assembly telescoped and the horizontal axis portions of the beam section articulating joints rotated to provide a compound shape to the beam support assembly and clearance of the end of the conveyor over and beyond an obstruction higher than the end of the conveyor.

FIG. 11B is a side elevation drawing of multi-axis adjustable conveyor 101 with articulating beam assembly 103 pivoted at beam pivot pin 123 by beam pivot cylinder 125. The figure also shows telescoping beam sections 109 of beam assembly 103 extended by respective beam extension cylinders shown in FIG. 4. Vertical joint portions 423 of articulated beam joints 111A, 111C, and 111D are rotated by control system 171 and the respective hydraulic motors and gears to provide a compound curve in elevation of beam assembly 103 and belt support assembly 105. The compound curving ability of beam assembly 103 and articulating belt support assembly 105 allows positioning of driven end segment 115 to complex target 1105A positions as shown in the figure. Belt 102 is omitted for clarity.

Figure 11C:
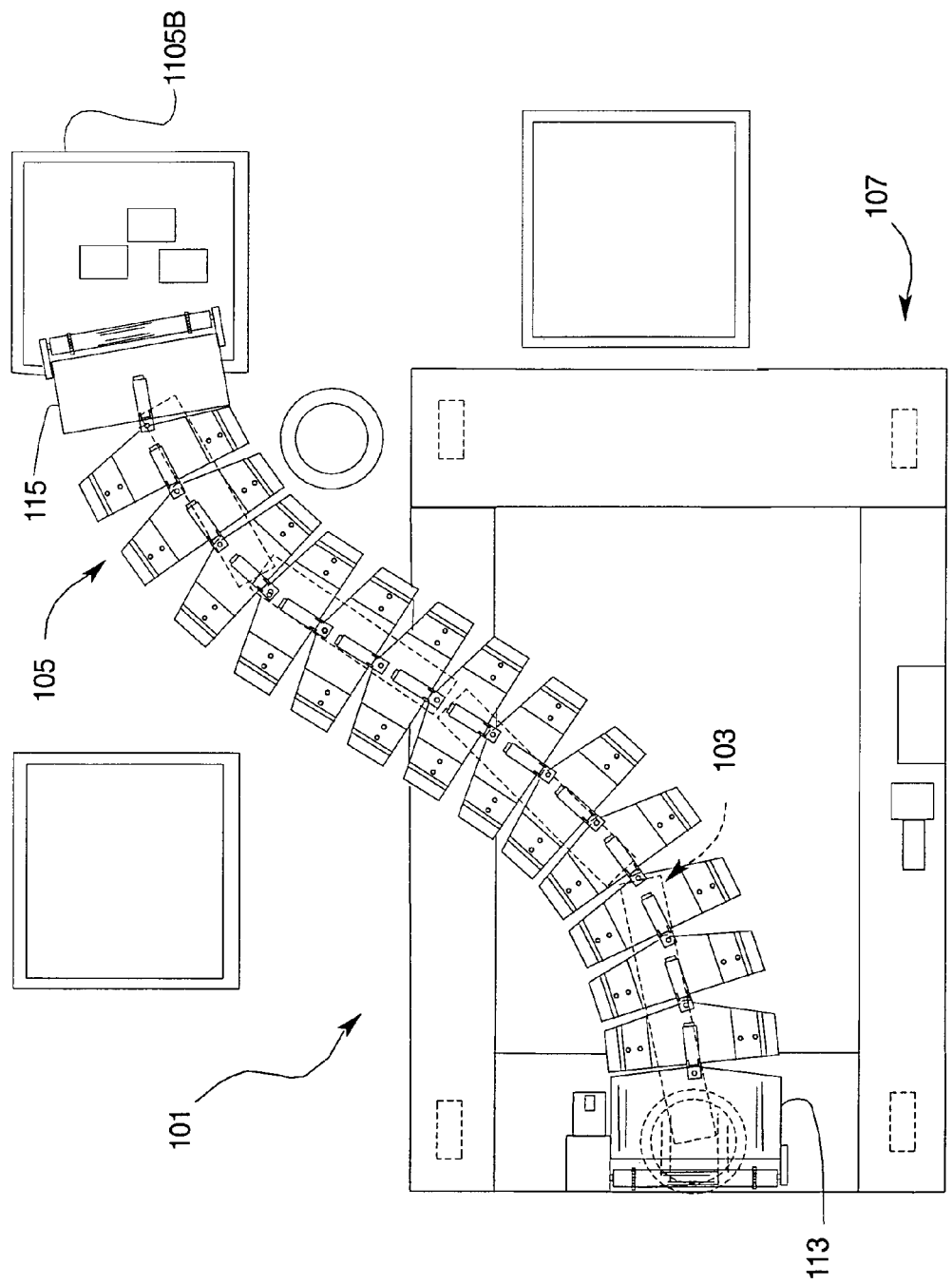
FIG. 11C is a plan view of the multi-axis conveyor showing the vertical axis portions of the beam section articulating joints rotated to provide a compound shape to the beam support assembly and clearance of the end of the conveyor around and beyond an obstruction near the end of the conveyor.

FIG. 11C is a plan view of multi-axis adjustable conveyor 101 where horizontal joint portions 425 of articulated beam joints 111 of FIG. 1 are rotated to provide a compound curve in lateral position of beam assembly 103 and belt support assembly 105. The compound curving ability of beam assembly 103 and articulating belt support assembly 105 allows positioning of driven end segment 115 to complex target 1105B positions as shown in the figure. Belt 102 is omitted for clarity.

Figure 12:
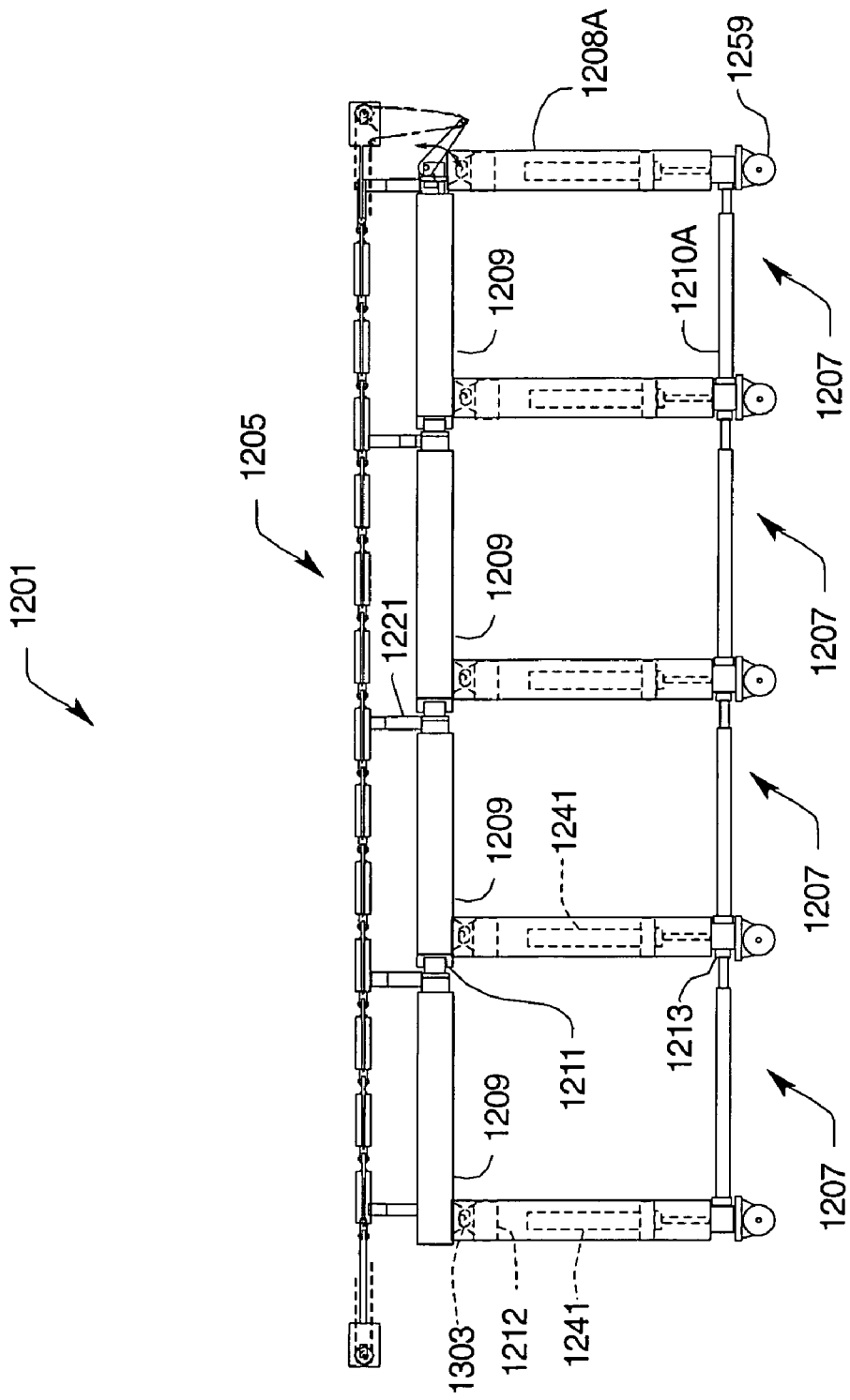
FIG. 12 is a side elevation drawing of an alternative embodiment of the multi-axis conveyor having a plurality of mobile support platforms supporting the belt support assembly.
Figure 13:
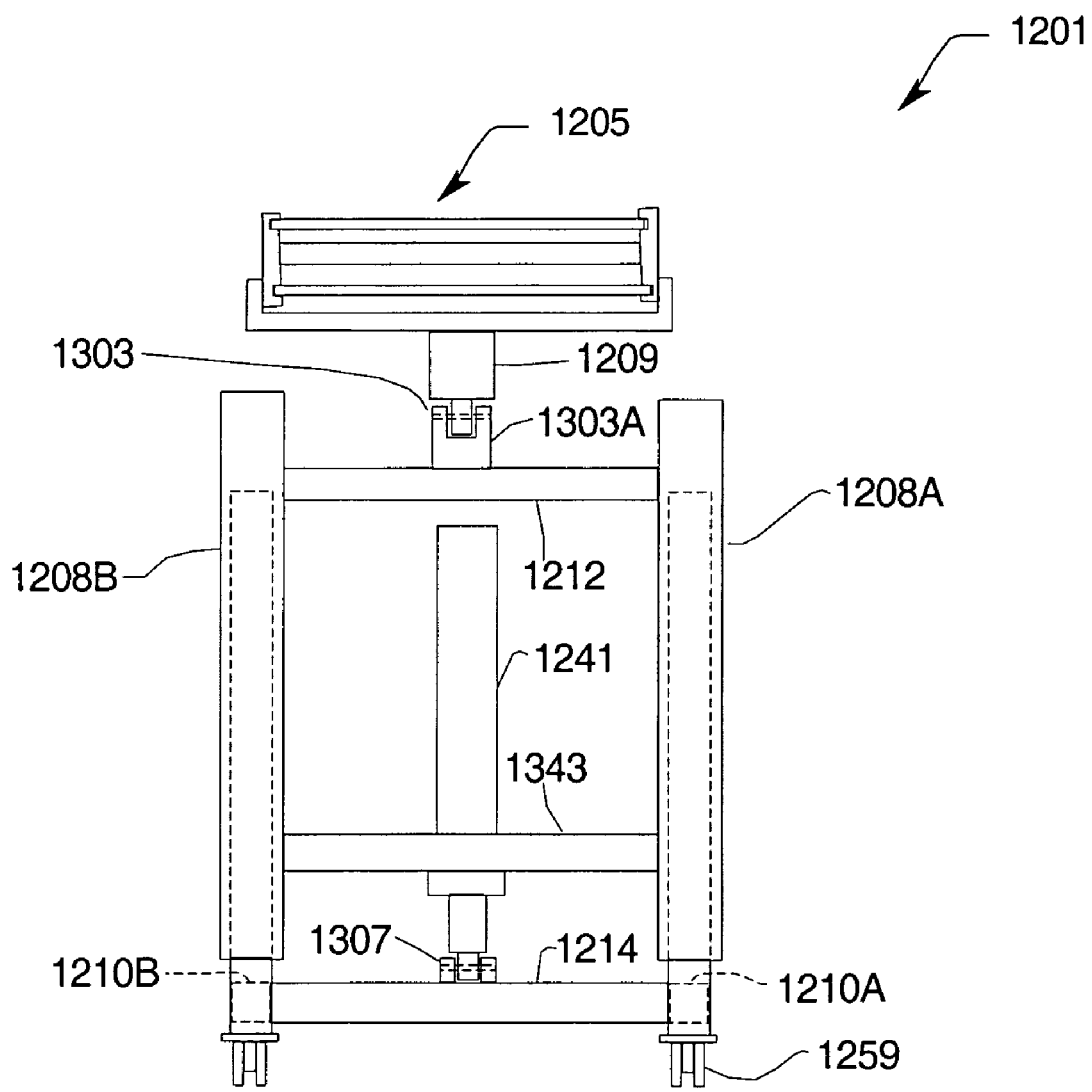
FIG. 13 is an end view of one of the support platforms of the embodiment of FIG. 12.

FIG. 12 is a side elevation drawing of an alternative embodiment of the multi-axis conveyor 1201 utilizing a plurality of mobile support platforms 1207 to support the articulating conveyor belt assembly 1205. FIG. 13 is an end view of a support platform 1207. Belt assembly 1205 may be the articulating belt assembly 105 of FIG. 1 or it may utilize other articulating embodiments.

In the preferred embodiments, each support platform 1207 consists of a pair of vertically extending platform columns 1208A, 1208B and bottom extending beams 1210A, 1210B. Upper crossbeams 1212 connected to the upper portions of columns 1208 and lower crossbeams 1214 connected to the lower portions of the columns provide necessary rigidity to the platforms. A means for providing mobility to platforms 1207 such as locking casters 1259 are attached to the lower portions of columns 1208.

Extendable support beam portions 1209 are pivotally connected to upper crossbeams 1212 of support platforms 1207 by pivot joints 1303. Pivot joints 1303, consisting of platform clevis 1303A, beam clevis 1303B and a clevis pin provide motions of belt assembly 1205 in a vertical plane. Joints such as support beam pivots 1211 and lower beam pivots 1213 allow platforms 1207 to deflect in a horizontal plane about a vertical axis with respect to each other. Platform extension cylinders 1401 shown in FIG. 14A and FIG. 14B and positioned inside support beams 1209 extend beams 1209 and platforms 1207 longitudinally with respect to each other.

In the preferred embodiments, platform support cylinders 1241 connected between crossbeams 1343 and pivot joint 1307 of lower crossbeams 1214 provide raising and lowering of extendable support beams 1209. Turning cylinders 1415, connected between clevis 1405 of support beam inner portion 1209A and clevis 1407 of support beam outer portion 1209B provide the motive force for turning of support platforms 12076 about a vertical axis. The turning cylinders and clevis are omitted from other drawings for clarity.

Figure 12B:
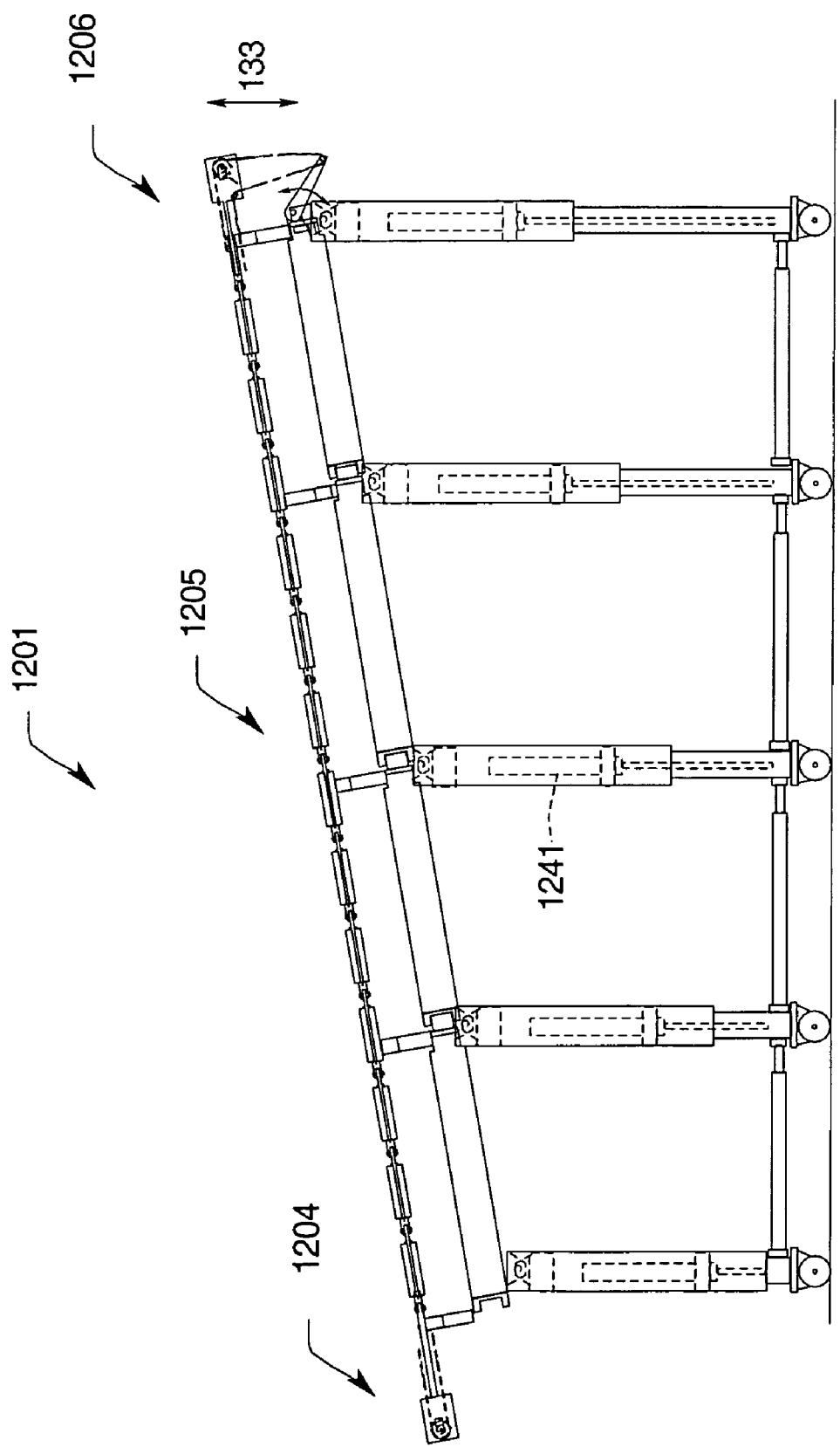
FIG. 12B is the multi-axis conveyor of FIG. 12 with the platform support cylinders raised to incline the belt support assembly.

FIG. 12B is a side elevation drawing of platform support cylinders 1241 in an extended condition to raise end 1206 of belt assembly 1205 with respect to end 1204 as shown by arrow 133.

Support beams 1209 may be part of platforms 1207, or they may be integral to articulating belt assembly 1205. In still other embodiments, multi-axis joints such as articulating beam joints 111 of FIG. 1 may replace beam pivots 1211 and lower beam pivots 1213. In still other embodiments, cylinders or other means to raise belt support assembly 1205 with respect to platforms 1207 may replace support posts 1221. Although four support platforms are shown in this embodiment, any number of support platforms may be utilized for the multi-axis conveyor of this invention.

In the preferred embodiments, conveyor structural members such as beams, columns, cross supports, pivot plates, and end assemblies are made of steel, aluminum, or other structural materials. Belt retainers may be made of plastics, metals, or ceramics that exhibit low sliding friction with the flexible belt, and have high abrasion resistance. In the preferred embodiments, high molecular weight polyethylene is used for the belt retainers.

In the preferred embodiments, flexible belt 102 is a modular flexible belt made of interlocking plastic members, such as series 2400 polypropylene Intralox® belt by Laitram LLC. In other embodiments, other flexible belts known in the art may be used.

Although the description above contains many specifications, these should not be construed as limiting the scope of the invention but merely providing illustrations of some of the presently preferred embodiments of this invention. For example, the belt retainers may utilize rollers or wheels instead of sliding elements. Rollers, casters or bottom pads may be attached to the bottom of support columns. Carriages or trucks may be used instead of the support platform. Ball and socket joints may be used for the articulating joints. Linear positioners such as recirculating ball assemblies or rack and pinion assemblies may be substituted for cylinders. Or, the locking castor wheels may be replaced with driven steerable wheels. Thus the scope of the invention should be determined by the appended claims and their legal equivalents, rather than by the examples given.

We claim:

1. A multi-axis adjustable conveyor for transporting articles comprising:
    a support platform;
    an articulating beam comprising a first end pivotally attached to a column of the support platform, the articulating beam comprising a plurality of telescoping beam segments connected by beam joints comprising at least two axes of motion;
    a belt support assembly attached to said plurality of telescoping beam segments comprising a plurality of belt support plates connected by plate support joints, said plate support joints comprising an extending portion and an articulating portion, said articulating portion comprising at least two axes of motion; and
    a flexible belt disposed on said belt support assembly.

2. The conveyor of claim 1 wherein said belt support assembly comprises a first end plate and a second end plate, said first end plate comprising a first belt support roller and said second end plate comprising a second belt support roller and said flexible belt defines a closed belt loop between said first belt support roller and said second belt support roller.

3. The conveyor of claim 2 wherein said belt support assembly comprises a biased tension roller inside said closed belt loop.

4. The conveyor of claim 3 comprising a drive roller attached to a rotary drive and disposed inside said closed belt loop.

5. The conveyor of claim 1 wherein said extending portion of said plate support joints comprises an elongated slot in at least a portion of said plurality of belt support plates.

6. The conveyor of claim 5 wherein said articulating portion of said plate support joints comprises a horizontal pivot pin and a vertical pivot pin.

7. The conveyor of claim 1 wherein said support column is a telescoping column.

8. The conveyor of claim 7 comprising a means for rotating said support column.

9. The conveyor of claim 1 wherein said platform comprises wheels supporting said platform from a support surface.

10. The conveyor of claim 1 wherein at least a portion of said plurality of belt support plates comprises belt retainer blocks providing sliding support for said flexible belt.

11. The conveyor of claim 10 wherein said belt retainer blocks comprise channels for retaining an edge of said flexible belt.

12. A multi-axis adjustable conveyor for transporting articles comprising:
    a plurality of support platforms, each of said plurality of support platforms comprising an extendable column and an extendable beam and connected to an adjacent support platform by a joint comprising at least one axis of rotation;
    a belt support assembly attached to said plurality of support platforms and comprising a first plurality of belt support plates connected by plate support joints, said plate support joints comprising an extending portion and an articulating portion, said articulating portion comprising at least two axes of motion; and
    a flexible belt disposed on said belt support assembly.

13. The conveyor of claim 12 wherein each of said plurality of support platforms comprises a connection with a single belt support plate wherein said each support platform supports a second plurality of support plates.

14. The conveyor of claim 12 wherein at least one of said plurality of support platforms comprises a wheel to allow relative motion of adjacent support platforms.

15. The conveyor of claim 12 wherein each said plurality of support platforms comprises a wheel to allow relative motion of adjacent support platforms.

16. The conveyor of claim 12 wherein at least one of said plurality of support platforms comprises a pair of extendable vertical columns, an upper cross beam attaching an upper portion of said pair of extendable vertical columns and a lower cross beam attaching a lower portion of said pair of extendable vertical columns.

17. The conveyor of claim 16 comprising a linear drive component connected between said upper cross beam and said lower cross beam for extending said pair of extendable vertical columns.

18. The conveyor of claim 17 wherein said linear drive component is a hydraulic cylinder.

* * * * *